(12) United States Patent  
McDougal

(10) Patent No.: US 10,214,063 B2  
(45) Date of Patent: Feb. 26, 2019

(54) SECURE TRAILER COUPLER

(71) Applicant: Ryan D McDougal, Orem, UT (US)

(72) Inventor: Ryan D McDougal, Orem, UT (US)

(*) Notice: Subject to any disclaimer, the term of this patent is extended or adjusted under 35 U.S.C. 154(b) by 38 days.

(21) Appl. No.: 15/496,191

(22) Filed: Apr. 25, 2017

(65) Prior Publication Data

US 2017/0313145 A1 Nov. 2, 2017

Related U.S. Application Data

(60) Provisional application No. 62/328,522, filed on Apr. 27, 2016.

(51) Int. Cl.  
*B60D 1/06* (2006.01)  
*B60D 1/60* (2006.01)

(52) U.S. Cl.  
CPC ............. *B60D 1/60* (2013.01); *B60D 1/065* (2013.01)

(58) Field of Classification Search  
CPC ............. B60D 1/60; B60D 1/06; B60D 1/065  
See application file for complete search history.

(56) References Cited

U.S. PATENT DOCUMENTS

| | | | | |
|---|---|---|---|---|
| 2,542,643 A * | 2/1951 | Duncan | ............... | B60D 1/065 280/513 |
| 4,774,823 A * | 10/1988 | Callison | ............... | B60D 1/60 280/507 |
| 4,925,205 A | 5/1990 | Villalon | | |
| 5,114,170 A | 5/1992 | Lanni | | |
| 5,476,281 A * | 12/1995 | Worthington | ............ | B60D 1/60 280/432 |
| 5,558,350 A * | 9/1996 | Kimbrough | ............. | B60D 1/06 280/426 |
| 6,382,657 B1 * | 5/2002 | Lynn | ............... | B60D 1/065 280/457 |
| 6,588,790 B2 * | 7/2003 | Hall | ............... | B60D 1/065 280/508 |
| 6,644,071 B2 * | 11/2003 | Gilbertson | ............... | B60D 1/60 280/507 |
| 6,962,361 B1 * | 11/2005 | Price | ............... | B60D 1/60 280/507 |
| 7,390,008 B1 * | 6/2008 | Hall | ............... | B60D 1/065 280/507 |
| 8,757,654 B2 * | 6/2014 | Lachance | ............... | B60D 1/28 280/507 |
| 8,967,654 B1 * | 3/2015 | Riibe | ............... | B60D 1/28 280/507 |
| 9,296,269 B1 * | 3/2016 | Riibe | ............... | B60D 1/06 |
| 2003/0193167 A1 * | 10/2003 | Hall | ............... | B60D 1/065 280/508 |

* cited by examiner

*Primary Examiner* — Joseph M Rocca  
*Assistant Examiner* — Michael R Stabley  
(74) *Attorney, Agent, or Firm* — Kirton McConkie; Brian Tucker

(57) ABSTRACT

A secure trailer coupler includes an adjustable plate that can be locked in a number of positions to thereby secure the trailer coupler when a trailer is disconnected from or connected to a vehicle. The adjustable plate can be integrated into the base of the trailer coupler such that no pry points are provided. The trailer coupler also includes a locking mechanism that is integrated inside the trailer coupler where it is inaccessible to any would-be thieves.

20 Claims, 15 Drawing Sheets

SECURE TRAILER COUPLER

CROSS-REFERENCE TO RELATED APPLICATIONS

This application claims the benefit of U.S. Provisional patent application No. 62/328,522 which was filed on Apr. 27, 2016.

BACKGROUND

A trailer coupler is a mechanism that is secured to the end of a trailer tongue and is configured to fit overtop and pivot on a vehicle's hitch ball. FIG. 1 provides an example of a typical trailer coupler 100. As shown, trailer coupler 100 includes a coupler body 110 that forms a ball socket 110a at one end. Ball socket 110a is configured to receive a hitch ball 160 thereby coupling a trailer to a vehicle. To secure trailer coupler 100 to hitch ball 160, trailer coupler 100 includes an underjaw 151 that is configured to lock under hitch ball 160. To enable underjaw 151 to be moved between a locked position (in which trailer coupler 100 cannot be removed from hitch ball 160) and an unlocked position (in which trailer coupler 100 can be removed from hitch ball 160), trailer coupler 100 includes a latch 150.

To prevent theft of a trailer, many trailer couplers have latches that are configured to receive a padlock. When locked, the latch, and therefore the underjaw, cannot be moved thereby preventing the trailer from being disconnected from or connected to a vehicle. However, such latches provide a minimal amount of security because the lock is exposed. For example, a thief can use bolt cutters to easily remove a padlock from a latch.

To address this issue, some products have been developed which cover a portion of or the entire trailer coupler to thereby prevent access to the latch and/or the lock. Although such products add a level of security to the trailer coupler, they are still easily defeated. For example, a thief may employ a sledge hammer or pry bar to forcefully remove such products.

BRIEF SUMMARY

The present invention is directed to a secure trailer coupler that includes an adjustable plate that can be locked in a number of positions to thereby secure the trailer coupler when a trailer is disconnected from or connected to a vehicle. The adjustable plate can be integrated into the base of the trailer coupler such that no pry points are provided. The trailer coupler also includes a locking mechanism that is integrated inside the trailer coupler where it is inaccessible to any would-be thieves.

In one embodiment, the present invention is implemented as a trailer coupler that includes: a coupler body having a hitch ball socket; a base plate secured to the coupler body, the base plate having a hitch ball opening to allow a hitch ball to be inserted into the hitch ball socket; an adjustable plate contained within the base plate and configured to be positioned at a plurality of positions within the base plate; and a locking mechanism that secures the adjustable plate in each of the plurality of positions.

In another embodiment, the present invention is implemented as a trailer coupler that includes: a coupler body forming a hitch ball socket; a base plate secured to an underside of the coupler body, the base plate forming a hitch ball opening to allow a hitch ball to be inserted into the hitch ball socket, the base plate also forming a channel; an adjustable plate that is contained within the channel and configured to slide within the channel between two or more positions; a locking mechanism that is concealed within the coupler body and that is configured to prevent the adjustable plate from sliding; and a lock that is coupled to the locking mechanism to cause the locking mechanism to allow the adjustable plate to slide within the channel.

In another embodiment, the present invention is implemented as a trailer coupler that includes: a coupler body; a base plate secured to the coupler body, the base plate forming a channel; an adjustable plate that is contained within the channel and is configured to move between two or more positions; a locking mechanism contained within the coupler body, the locking mechanism interfacing with the adjustable plate to prevent the adjustable plate from moving from each of the two or more positions; and a lock that interfaces with the locking mechanism to cause the locking mechanism to allow the adjustable plate to move from each of the two or more positions.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
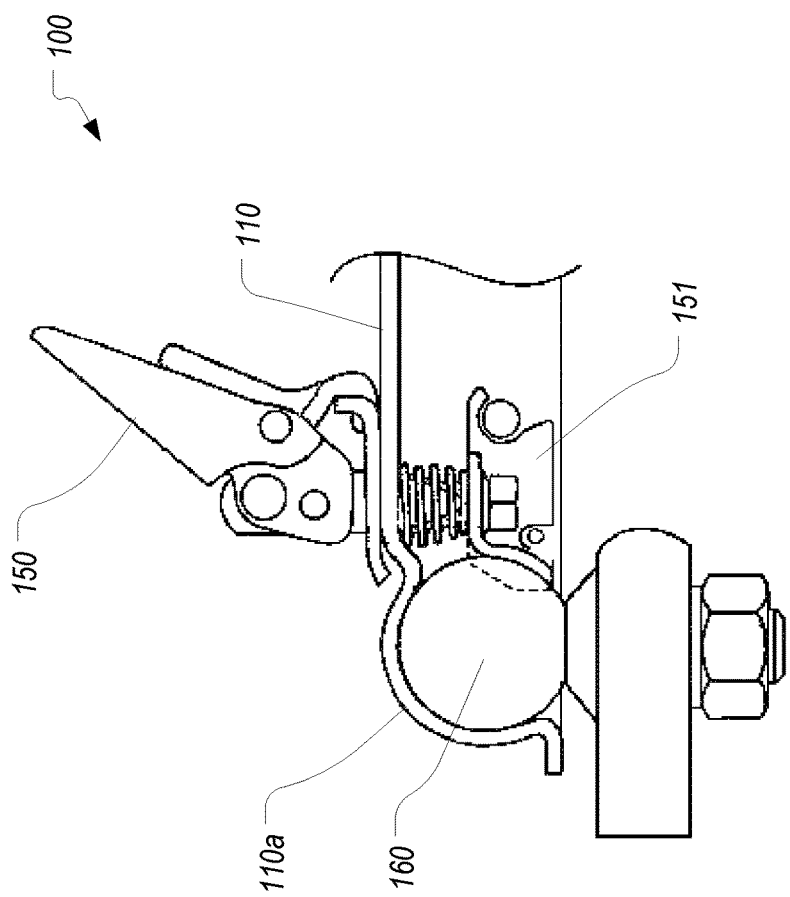
FIG. 1 illustrates a common prior art trailer coupler.

In this specification and the claims, the term "trailer coupler" should be construed as a component that is coupled to a tongue of a trailer for the purpose of enabling the trailer to be connected to a hitch ball. Trailer coupler should therefore be construed as encompassing straight-tongue couplers, a-frame couplers, channel-mount couplers, etc. A trailer coupler configured in accordance with embodiments of the present invention can include any of the various types of latch/underjaw configurations. In fact, the particular manner in which the trailer coupler is secured to the hitch ball is not essential to the present invention. For example, a trailer coupler in accordance with the present invention can employ the standard latch 150 and underjaw 151 depicted in FIG. 1.

Figure 2A:
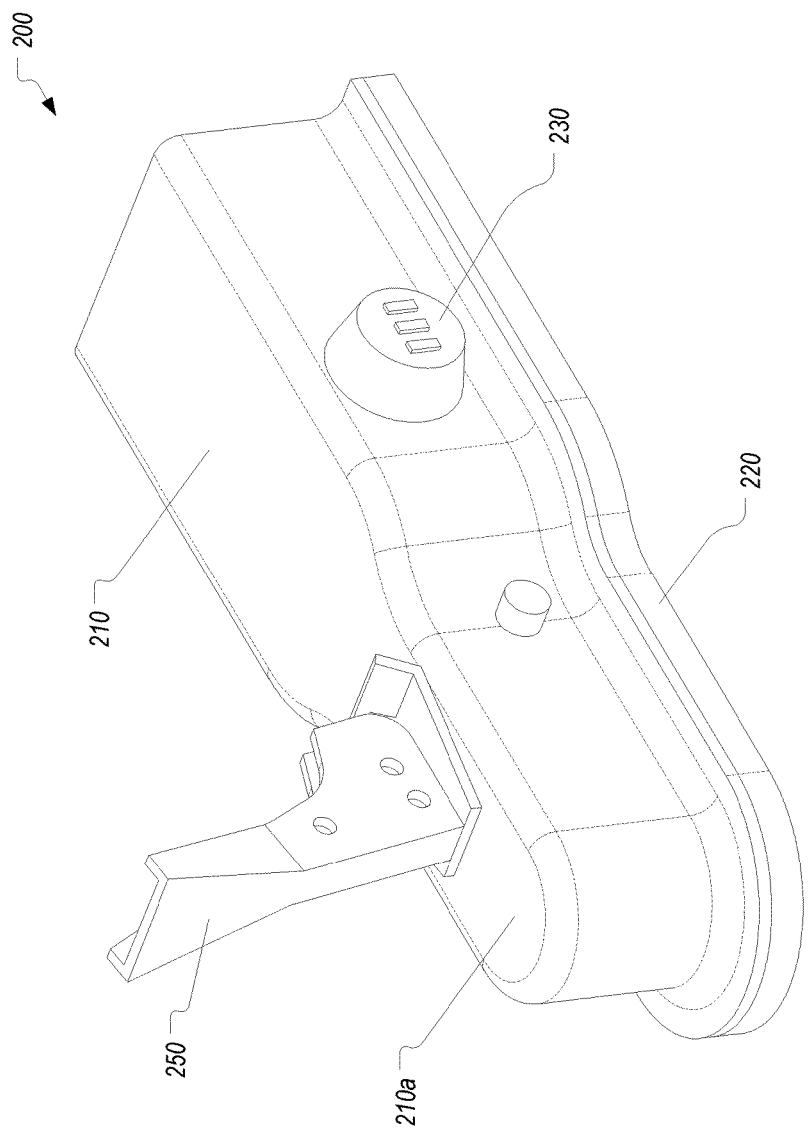
FIGS. 2A-2G illustrate various views of a secure trailer coupler that is configured in accordance with one or more embodiments of the present invention.
Figure 2B:
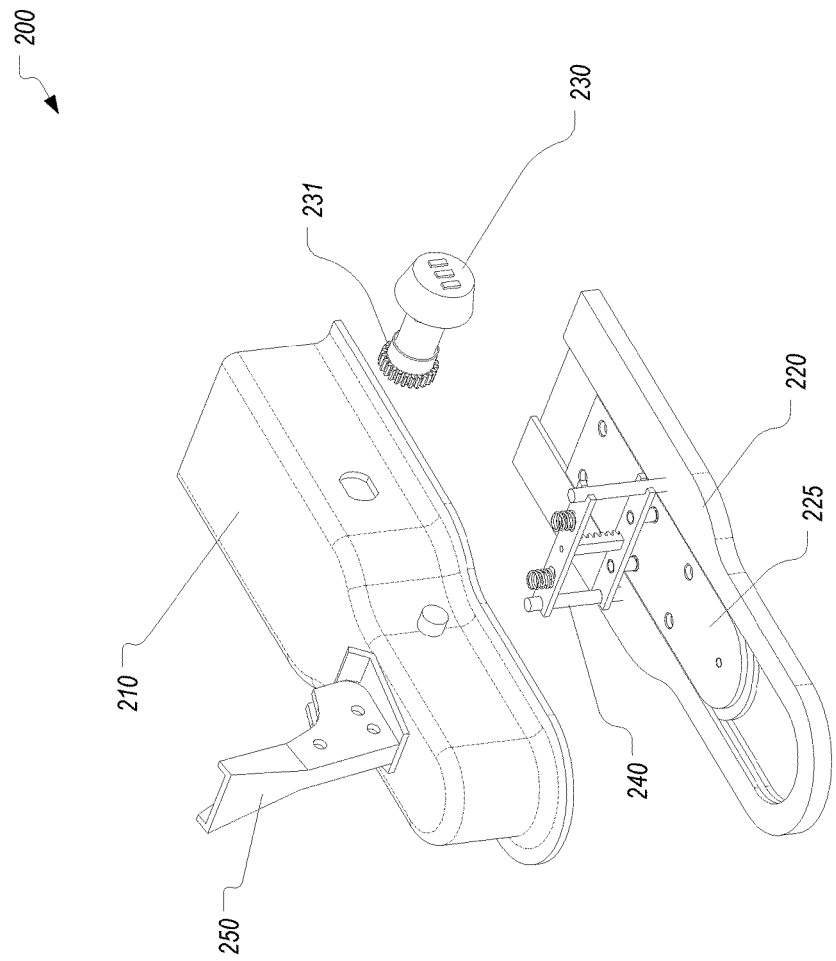
Figure 2C:
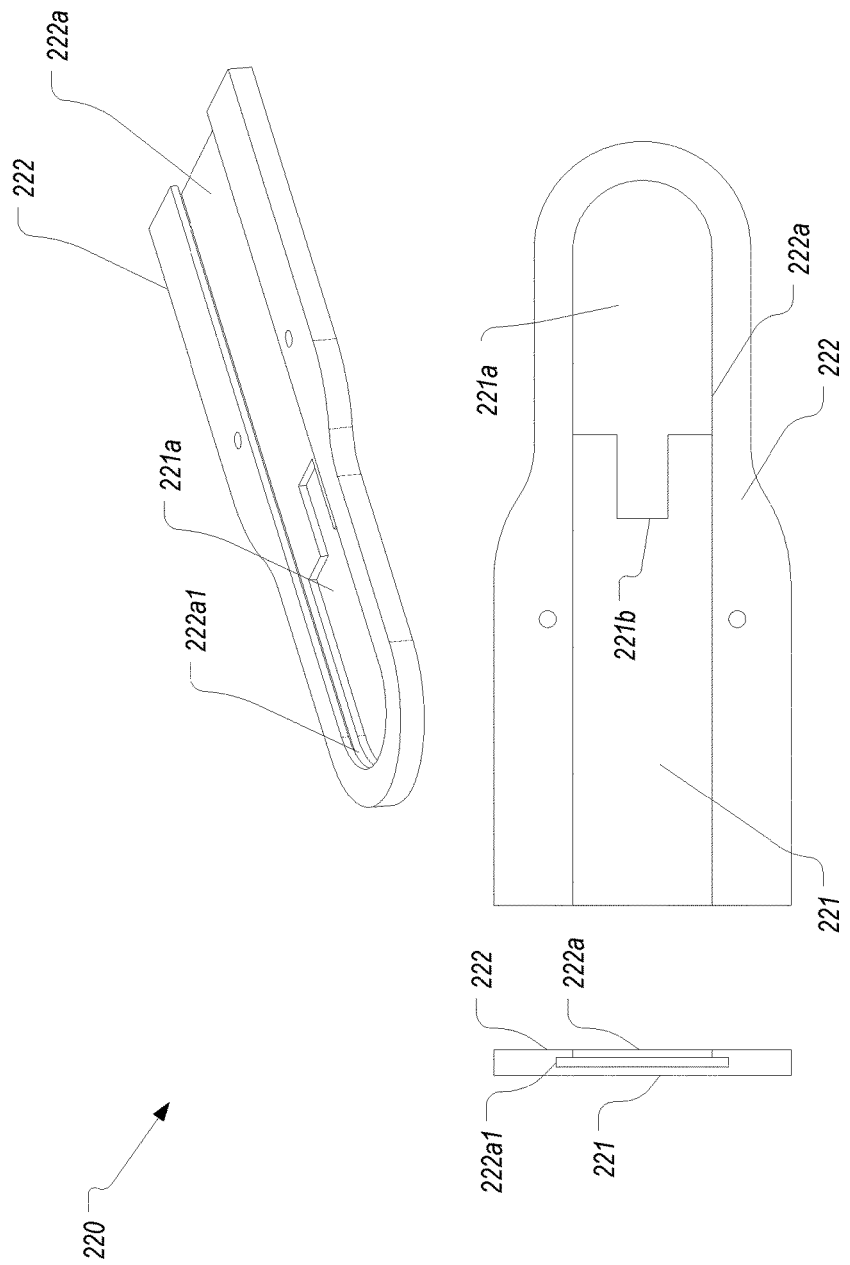
Figure 2D:
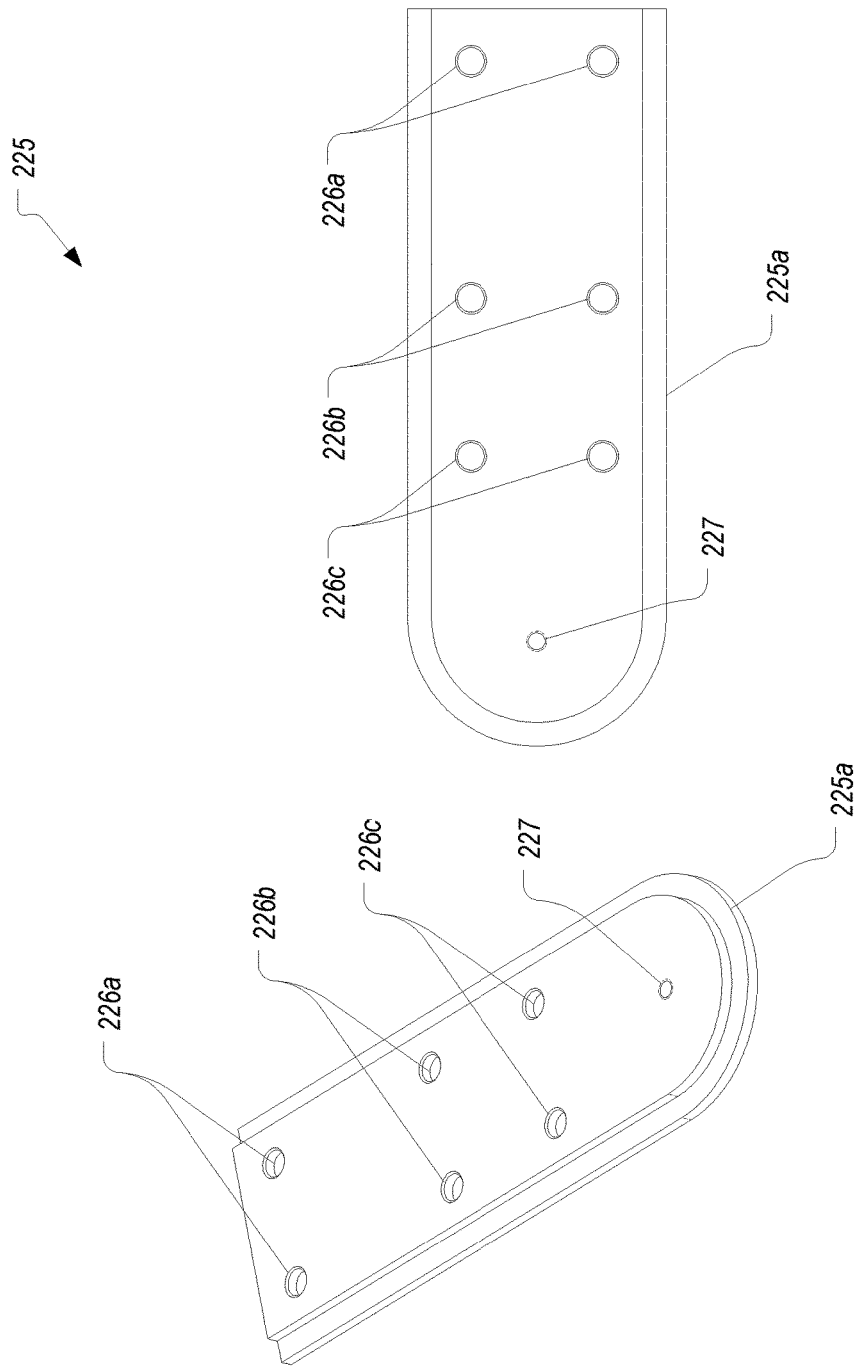
Figure 2E:
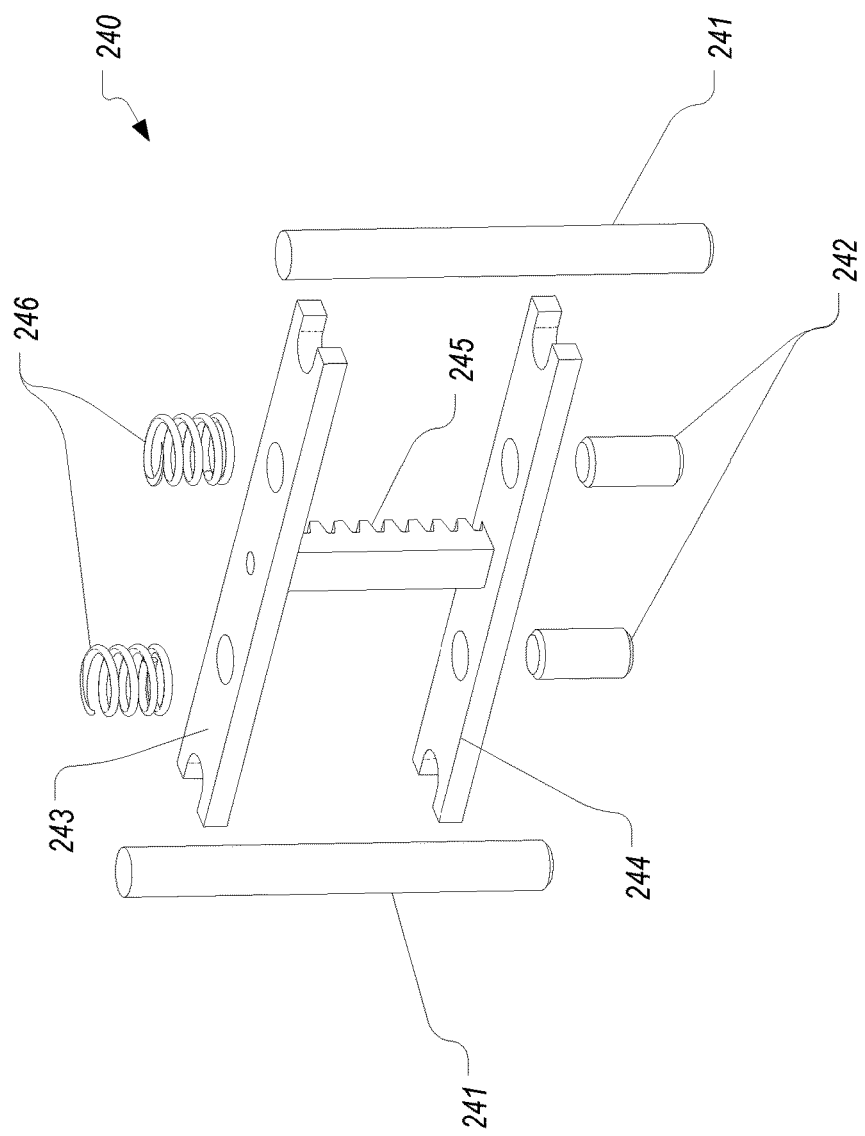
Figure 2F:
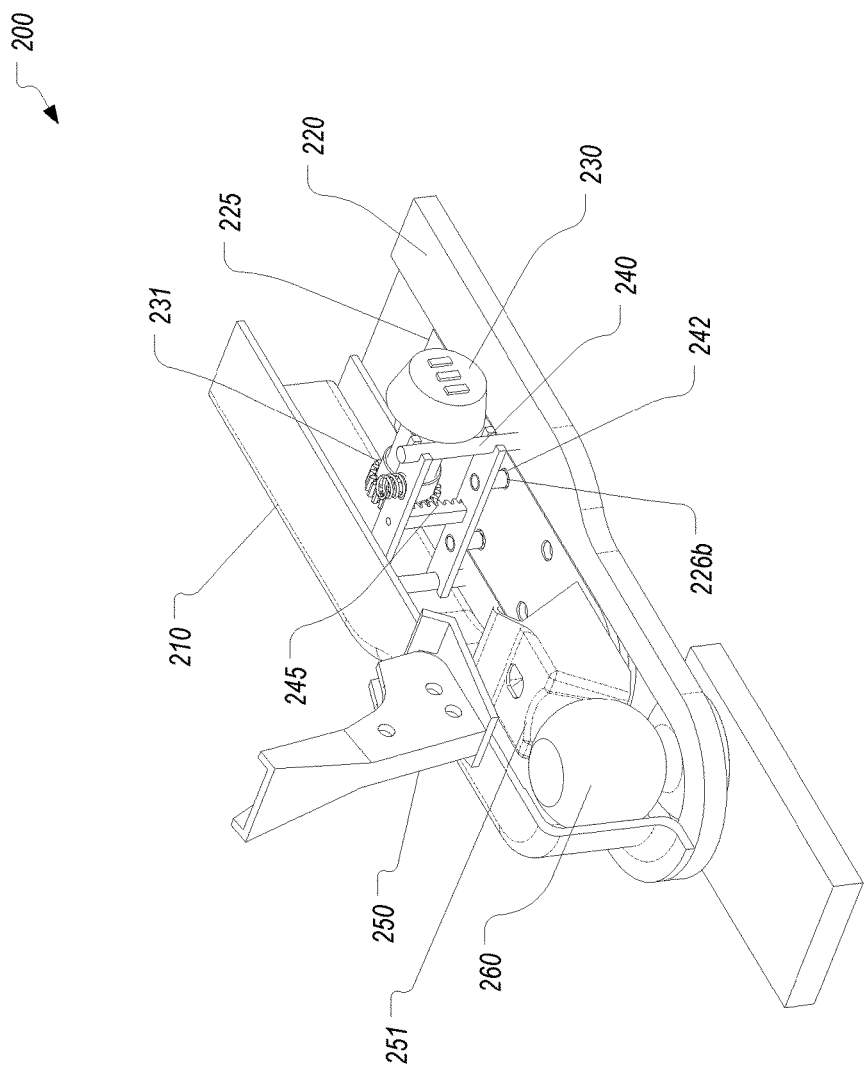
Figure 2G:
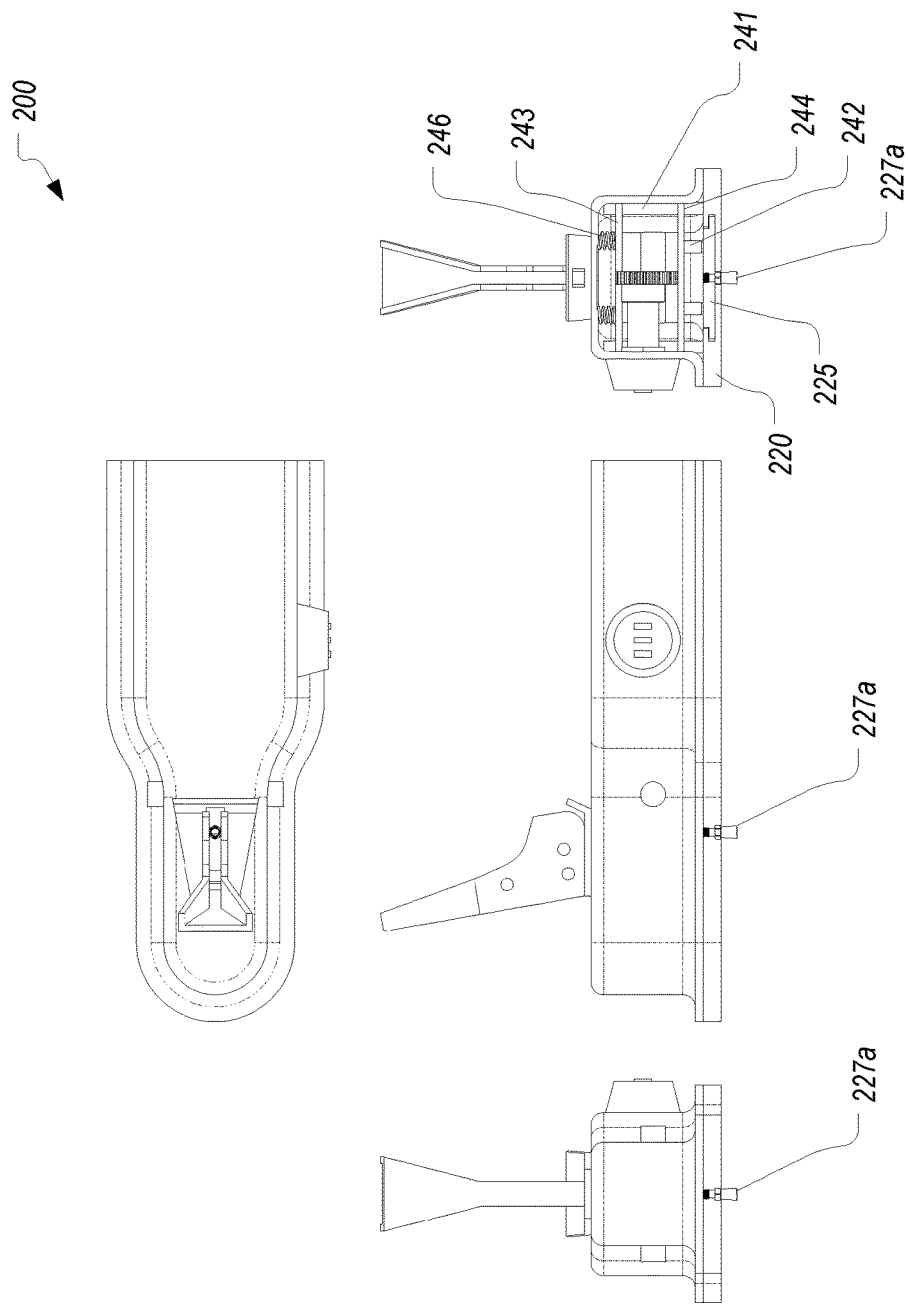

FIGS. 2A-2G provide various views of a trailer coupler 200 that is configured in accordance with one or more embodiments of the present invention. As best shown in FIGS. 2A, 2B and 2F, trailer coupler 200 includes a coupler body 210 that is configured as a straight-tongue coupler. A hitch ball socket 210a is formed at a forward end of trailer coupler 200 and can be shaped and sized to receive any of the various sizes of hitch balls such as hitch ball 260. In this example, trailer coupler 200 is shown as employing a conventional latch 250 and underjaw 251.

Trailer coupler 200 also includes a base plate 220 that is coupled to the underside of coupler body 210. Base plate 220 can have external dimensions that generally conform to the external dimensions of the underside of coupler body 210. Base plate 220 incorporates an adjustable plate 225 that is configured to slide along the length of base plate 220. The combination of base plate 220 and adjustable plate 225 generally functions as a cover for the underside of coupler body 210 as will be further described below.

Trailer coupler 200 also includes a locking mechanism 240 that is integrated inside coupler body 210. Locking mechanism 240 functions to lock adjustable plate 225 in one of a number of positions to thereby secure trailer coupler 200 when it is both connected to and disconnected from a hitch ball. Trailer coupler 200 can also incorporate a lock 230 by which a user can manipulate locking mechanism 240. Accordingly, adjustable plate 225 can only be repositioned via lock 230.

FIGS. 2C and 2D each provide various views of base plate 220 and adjustable plate 240 respectively. As mentioned above, the external dimensions of base plate 220 can substantially match (or at least be greater than) the external dimensions at the bottom of coupler body 210. This will allow coupler body 210 to be secured (e.g., via welding or bolts) to base plate 220. Base plate 220 comprises a bottom portion 221 and a top portion 222. Top portion 222 has a general U-shape so that a channel 222a is formed within top portion 222 and above bottom portion 221. A sliding slot 222a1 is also formed around an inner surface of base plate 220. The external dimensions of sliding slot 222a1 are greater than the external dimensions of channel 222a so that sliding slot 222a1 can function to retain adjustable plate 225 within base plate 220 as will be further described below.

A hitch ball opening 221a is formed at a forward end of bottom portion 221 which allows a hitch ball to be inserted through base plate 220. In some embodiments, hitch ball opening 221a may include a backward projecting notch 221b for accommodating a finger hold 227a by which adjustable plate 225 can be manipulated.

Adjustable plate 225 has dimensions that correspond to the inner dimensions of top portion 222 and sliding slot 222a1. As a result, adjustable plate 225 can be slid but retained within channel 222a. A retaining ledge 225a extends around adjustable plate 225 and is configured to insert into sliding slot 222a1. Adjustable plate 225 also includes multiple sets of locking pin openings 226a-226c. Each set of locking pin openings 226a-226c is positioned on adjustable plate 225 to allow adjustable plate 225 to be locked at a corresponding position. These positions can include an open position, a tow mode position, and a closed position. Adjustable plate 225 may also include an opening 227 by which finger hold 227 is coupled to adjustable plate 225.

Turning now to FIG. 2E, an exploded view of locking mechanism 240 is provided. Locking mechanism 240 includes an upper rail 243 and a lower rail 244 that are each positioned between and configured to slide along opposing rail studs 241. Upper rail 243 is coupled to lower rail 244 via a rack gear 245. One or more springs 246 are positioned above upper rail 243 and bias locking mechanism 240 in a downward position. Two locking pins 242 extend downwardly from lower rail 244 and are spaced in accordance with the spacing between each set of locking pin openings 226a-226c.

As shown in FIG. 2B, lock 230 can include a pinion gear 231 which interfaces with rack gear 245 so that locking mechanism 240 is lifted when lock 230 is turned in a clockwise direction. More particularly, as rack gear 245 is lifted, upper rail 243 and lower rail 244 can slide along rail studs 241 thereby lifting locking pins 242. During this lifting, upper rail 243 will compress springs 246 so that locking mechanism 240 is biased downwardly. With locking pins 242 lifted, adjustable plate 225 can be moved into the desired position. Then, when the user releases lock 230, locking mechanism 240 will return to the lowered position thereby inserting and retaining locking pins 242 within the corresponding locking pin openings. It is noted that rack gear 245 and pinion gear 231 are only one way in which lock 230 can interface with locking mechanism 240. Any mechanism for translating rotation of lock 230 into upward movement of locking mechanism 240 (or at least upward movement of locking pins 242) could be employed. Also, in some embodiments, lock 230 could include a servo or other powered motor so that manual force is not required to control locking mechanism 240. In further embodiments, lock 230 could include a wireless receiver by which locking mechanism 240 can be controlled wirelessly.

FIGS. 2B and 2F best illustrate how adjustable plate 225 can be moved into a desired position (e.g., the open position, tow mode position, or closed position). In both these figures, adjustable plate 225 is positioned so that locking pins 242 are inserted into locking pin openings 226b and is therefore in the tow mode position. In this position, the forward end of adjustable plate 225 can extend under hitch ball 260 and would therefore prevent trailer coupler 200 from being removed from hitch ball 260.

To remove trailer coupler 200 from hitch ball 260, an individual could input the proper code into lock 230 (or use a key if lock 230 were a keyed lock) and then turn lock 230 clockwise to lift locking pins 242. The individual could then use finger hold 227a to slide adjustable plate 225 backwards until locking pins 242 are aligned with locking pin openings 226c. With locking pins 242 aligned with locking pin openings 226c, springs 246 will cause locking pins 242 to insert through and be locked in locking pin openings 226c. This same process can be performed to move adjustable plate 225 to any of the other positions.

When trailer coupler 200 is not connected to a hitch ball, adjustable plate 225 can be slid fully forward (i.e., to the closed position) so that retaining ledge 225a is fully contained within sliding slot 222a1. In this position, locking pins 242 will align with locking pin openings 226a to prevent adjustable plate 225 from being moved. Also, in this position, adjustable plate 225 will cover hitch ball opening 221a to prevent trailer coupler 200 from being connected to a hitch ball. Because retaining ledge 225a inserts into sliding slot 222a1, no pry points will exist. Therefore, it would be very difficult to move adjustable plate 225 using brute force.

FIGS. 3A-3I illustrate a trailer coupler 300 that is configured in accordance with one or more embodiments of the present invention. Many components of trailer coupler 300 are similar to corresponding components of trailer coupler 200 and will therefore not be described in detail. Also, similar reference numbers have been used to identify these similar components.

Like trailer coupler 200, trailer coupler 300 includes a coupler body 310, a base plate 320, an adjustable plate 325, a lock 330, a locking mechanism 340, a latch (not shown), and an underjaw 351. Trailer coupler 300 is configured as an a-frame coupler. It is noted, however, that trailer coupler 300 could equally be configured in accordance with other types of couplers.

Figure 3A:
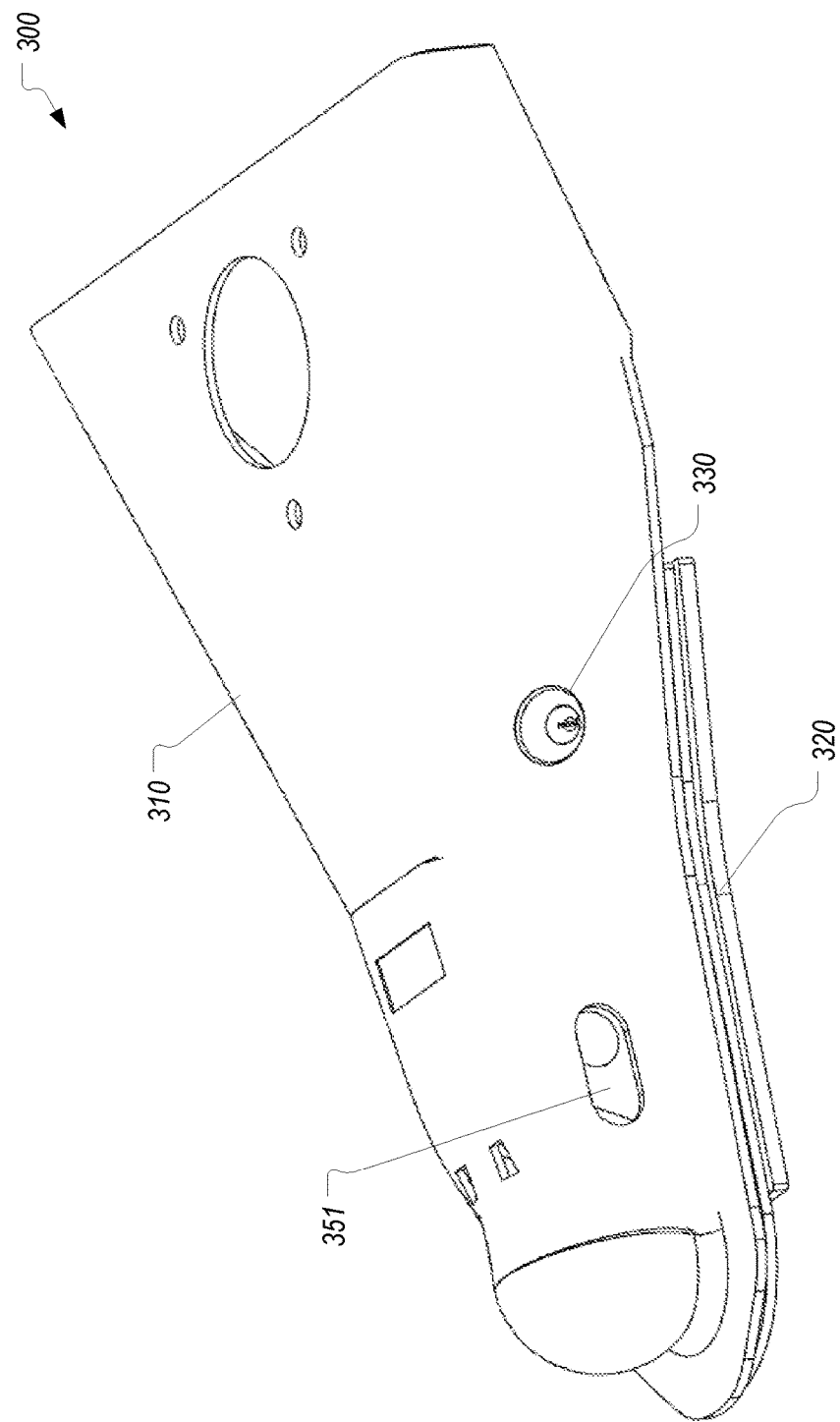
FIGS. 3A-3I illustrate various views of another secure trailer coupler that is configured in accordance with one or more embodiments of the present invention.
Figure 3B:
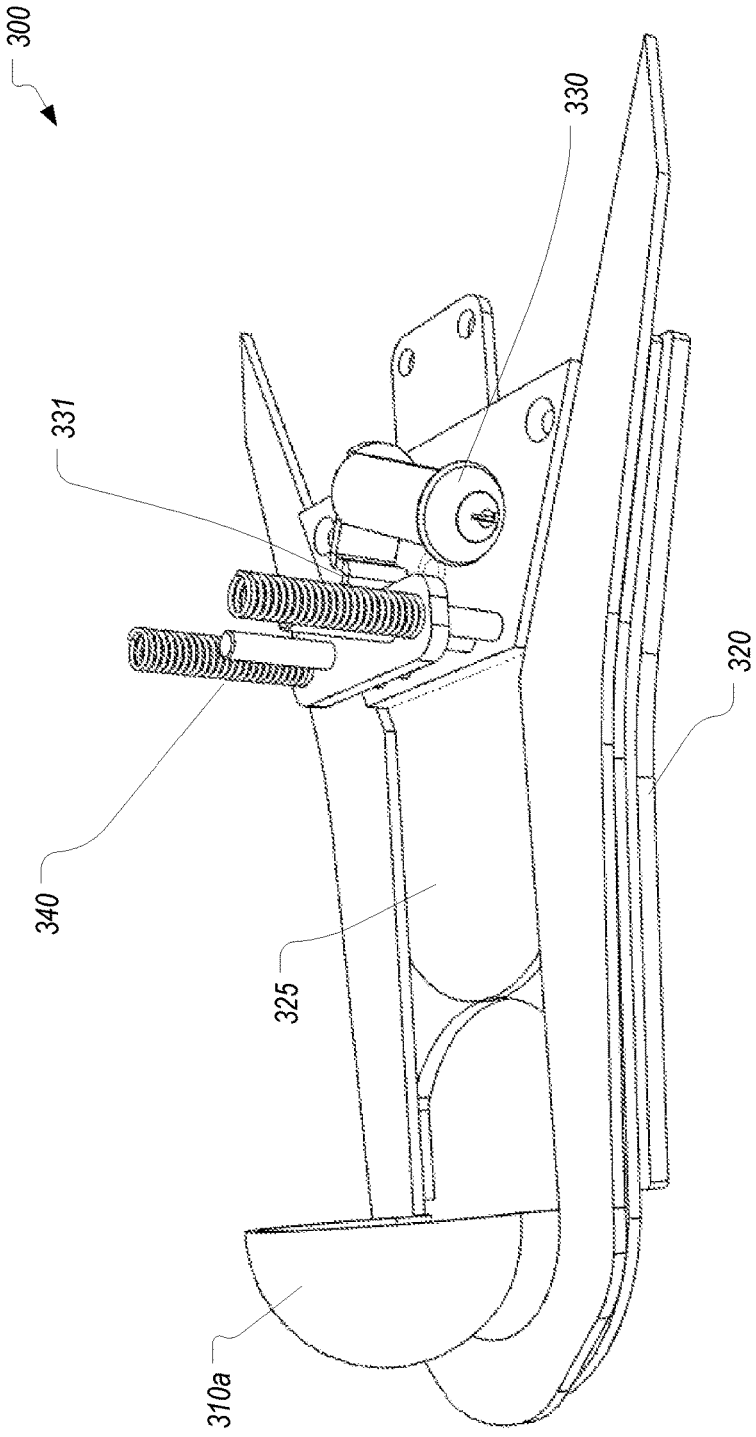

FIG. 3B provides a cutaway view of trailer coupler 300 in which the majority of coupler body 310 has been removed.

As shown, an underside of coupler body 310 can conform to base plate 320 as described above. Generally speaking, trailer coupler 300 functions in the same manner as trailer coupler 200 but includes a number of structural variations.

Figure 3D:
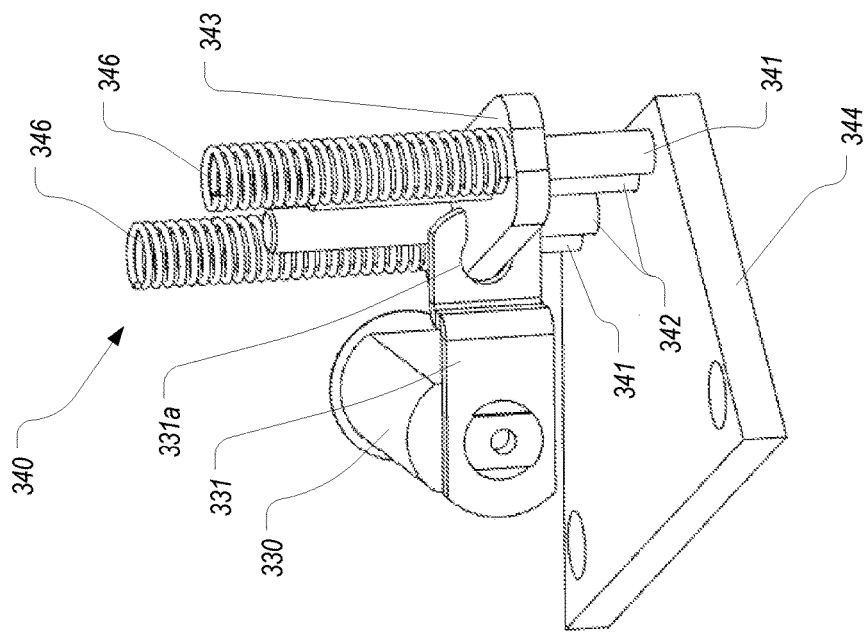
Figure 3C:
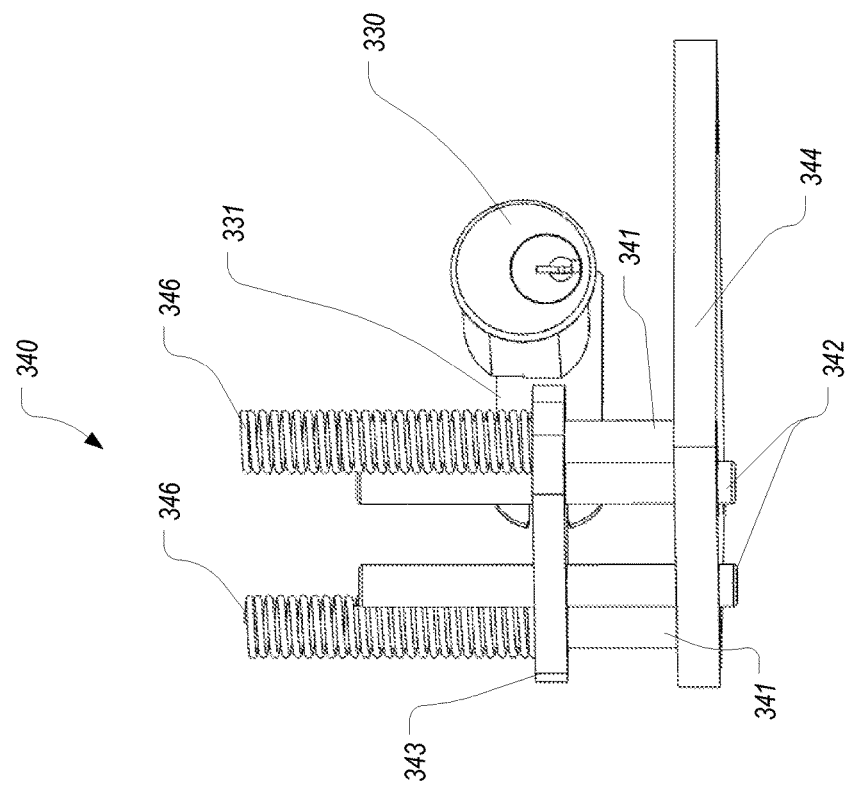
Figure 3E:
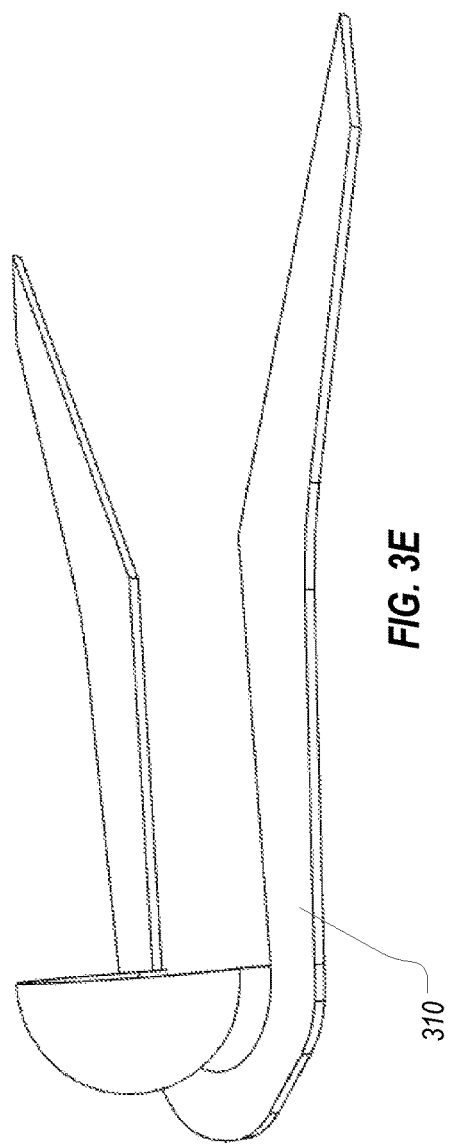
Figure 3F:
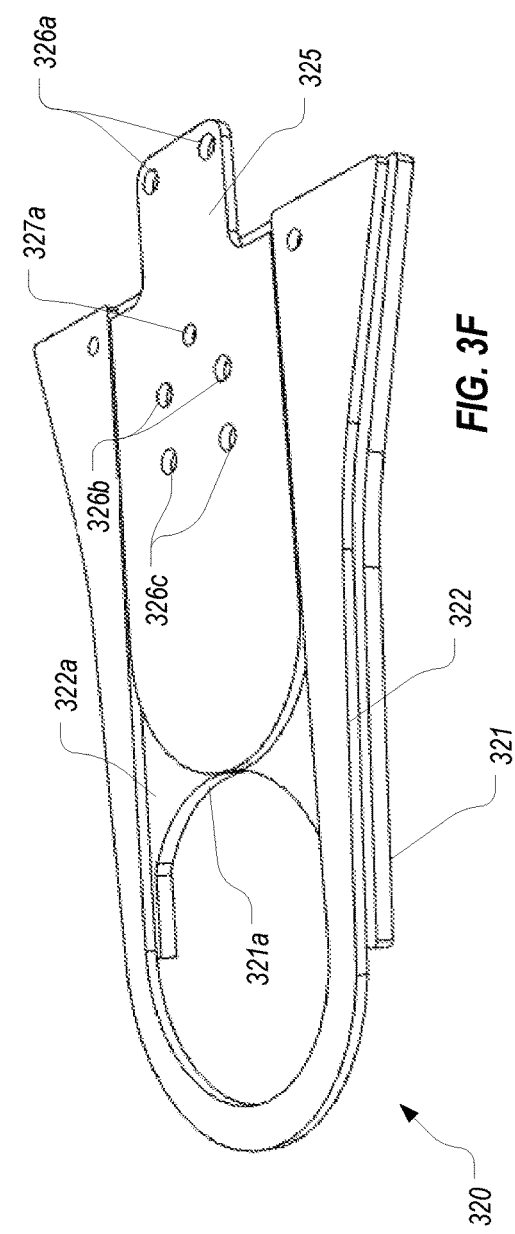
Figure 3G:
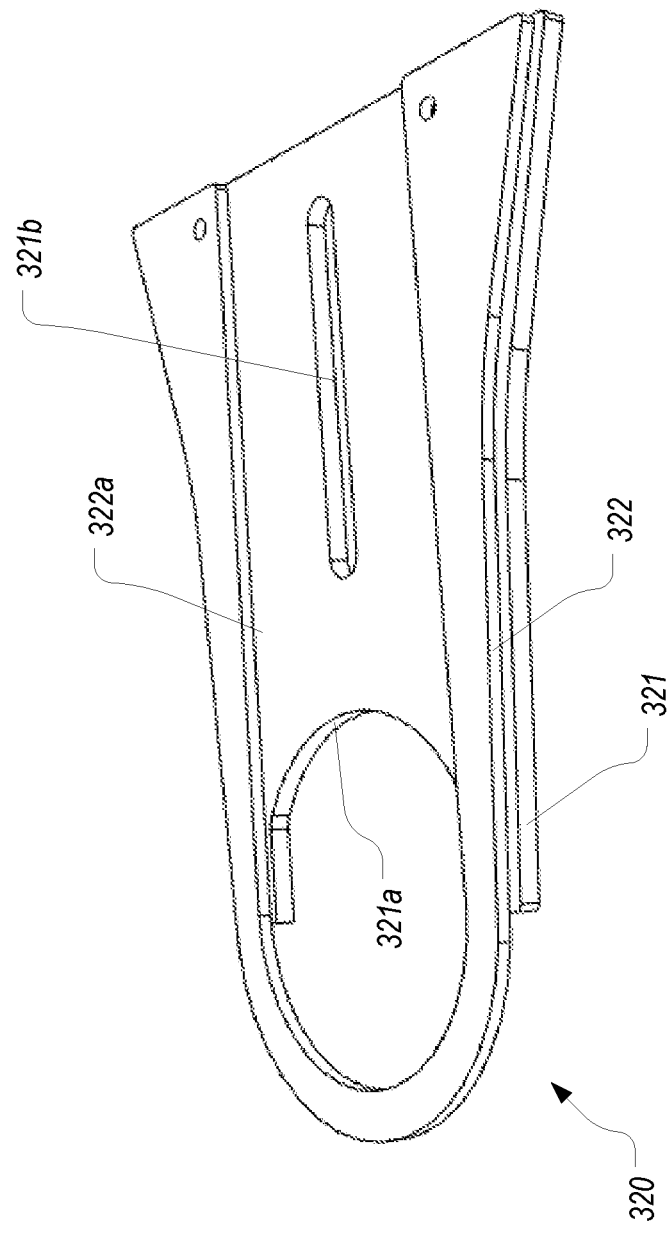

FIGS. 3C and 3D each illustrate an isolated view of lock 330 and locking mechanism 340. Similar to locking mechanism 240, locking mechanism 340 includes an upper rail 343 that is coupled to and configured to slide along opposing rail studs 341. In this embodiment, however, lower rail 344 is coupled to upper portion 322 of base plate 320 and therefore remains stationary (i.e., upper rail 343 slides relative to lower rail 344). Also, two locking pins 342 extend downwardly from upper rail 343 through lower rail 344 and are spaced in accordance with the spacing between each set of locking pin openings 326a-326c formed in adjustable plate 325. In this embodiment, locking pins 342 are also configured to extend through upper plate 343 which can provide added strength to locking pins 342. Also, in this embodiment, springs 346 are positioned around rail studs 341.

Lock 330 differs from lock 230 in that lock 330 does not include a pinion gear. Instead, lock 330 includes a pivoting arm 331 having an opening 331a into which upper plate 343 inserts. As a result, as lock 330 is turned clockwise, pivoting arm 331 will cause upper plate 343 to slide upwardly along rail studs 341 thereby elevating locking pins 342. It is noted that lock 230 could instead be used in place of lock 330 in this embodiment by modifying locking mechanism 340 to include a rack gear. Also, any other suitable coupling could be employed to cause rotation of lock 330 to be translated into upward movement of locking pins 342.

Figure 3H:
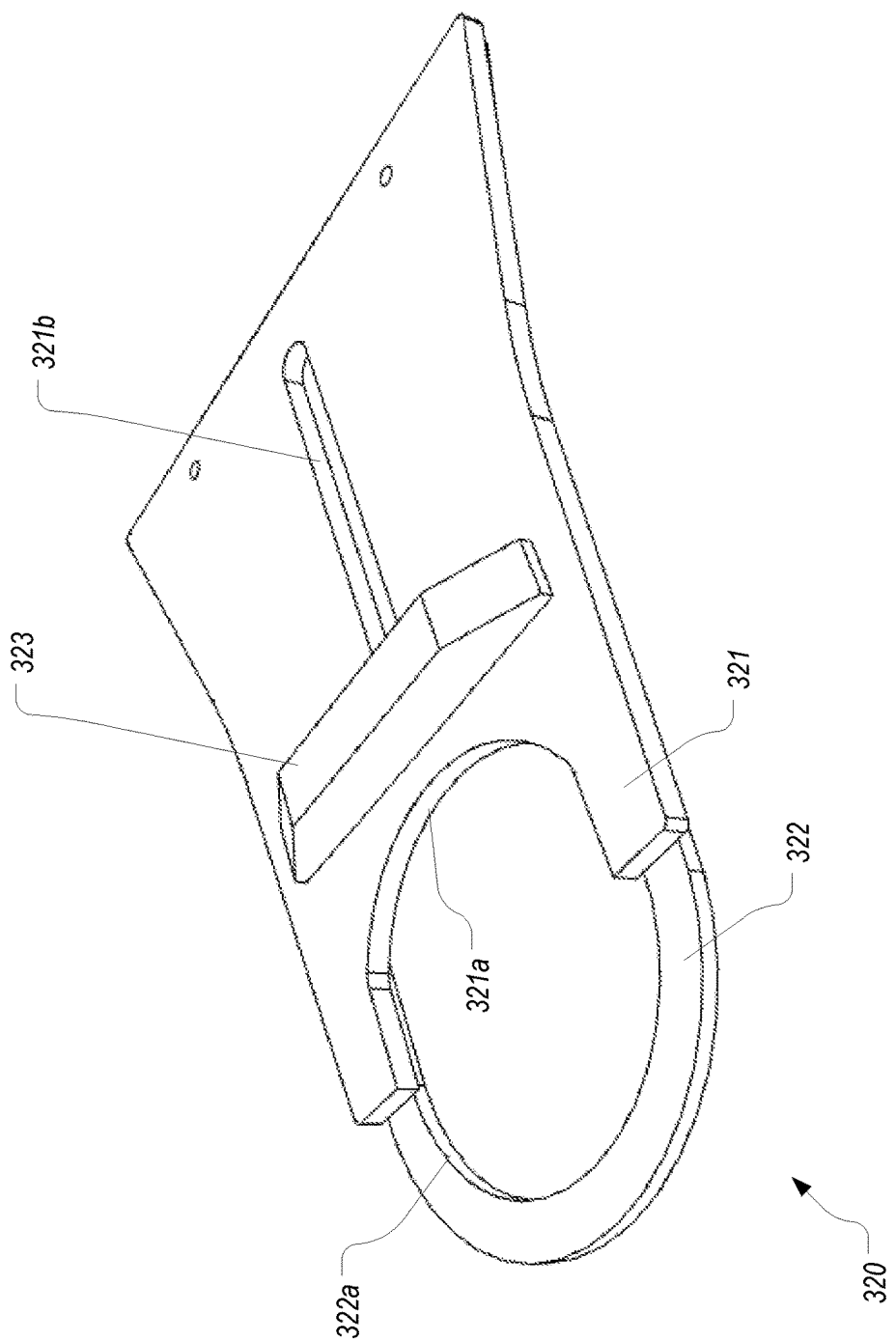
Figure 3I:
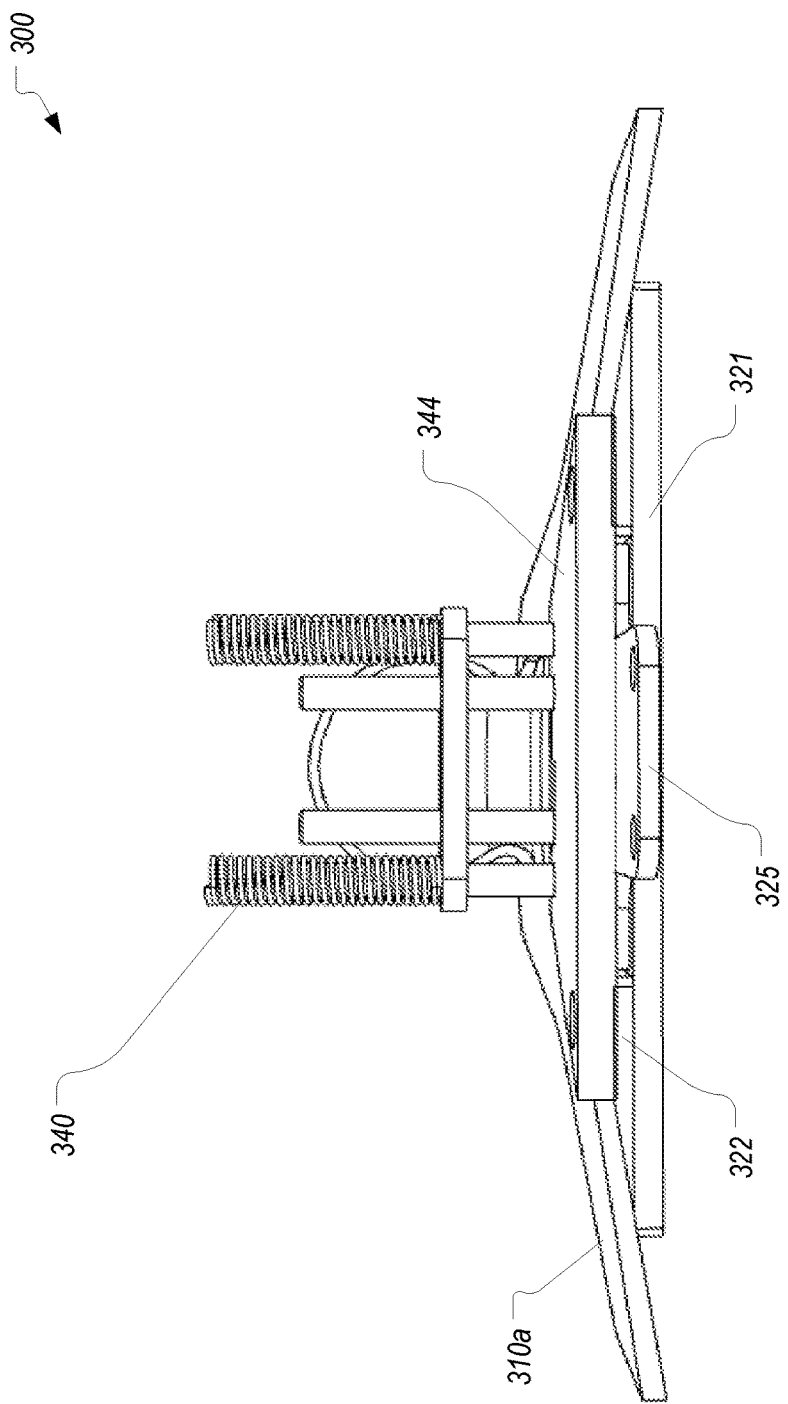

FIGS. 3E-3H illustrate how base plate 320 and adjustable plate 325 are configured. Based plate 320 comprises a lower portion 321 and an upper portion 322 that are shaped and combined together to form a hitch ball opening 321a and a channel 322a. A primary distinction between base plate 320 and base plate 220 is that base plate 320 does not include a sliding slot. Therefore, adjustable plate 325 also does not include a retaining ledge. Instead, adjustable plate 325 is retained within channel 322a by being sandwiched between lower portion 321 (which may or may not be a separate component from upper portion 322) and lower rail 344 of locking mechanism 340. Additionally, coupler body 310 can be configured to overlap channel 322a as is best seen in FIG. 3B. Accordingly, adjustable plate 325 slides underneath a portion of coupler body 310 and lower rail 344 as is best seen in FIG. 3I which provides a rear view of trailer coupler 300 with a portion of coupler body 310 removed.

A finger hold (not shown) similar to finger hold 227 can extend downwardly from adjustable plate 325. However, in this embodiment, lower portion 321 can include a slot 321b (as opposed to notch 221b) within which the finger hold can slide. As shown in FIG. 3H, which provides a bottom view of base plate 320, a ridge 323 may protrude downwardly from lower portion 321 near opening 321a and substantially span the width of base plate 320. Ridge 323 can function to block access to opening 321a when trailer coupler 300 is secured to a hitch ball. More specifically, ridge 323 can prevent a pry bar from being inserted between base plate 321 and a hitch ball mount.

In summary, a trailer coupler in accordance with embodiments of the present invention can include an adjustable plate that is configured to be moved to and locked in a number of positions. A locking mechanism that is integrated within the coupler body only allows the adjustable plate to be moved via a lock.

Although the adjustable plate has been described and depicted as a sliding plate, in some embodiments, the adjustable plate could instead be configured to pivot between the various positions. For example, the adjustable plate could be secured within the trailer coupler via a pivoting connection and the locking mechanism could be configured to prevent the adjustable plate from pivoting between the positions absent proper access to the lock.

In some embodiments, the adjustable plate can be configured to function in place of the underjaw. In such embodiments, when in the tow mode position, the adjustable plate will be situated underneath the hitch ball and will secure the trailer coupler to the hitch ball. To facilitate this, as well as to facilitate the pivoting of the hitch ball within the trailer coupler, a forward end of the adjustable plate can be shaped similar to an underjaw. Of course, in such embodiments, the trailer coupler would not need a latch.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A trailer coupler comprising:
a coupler body having a hitch ball socket;
a base plate secured to the coupler body, the base plate having a hitch ball opening to allow a hitch ball to be inserted into the hitch ball socket;
an adjustable plate contained within the base plate and configured to be positioned at a plurality of positions within the base plate, the adjustable plate including a set of one or more openings corresponding to each of the plurality of positions; and
a locking mechanism that secures the adjustable plate in each of the plurality of positions, the locking mechanism including one or more locking pins that insert into a corresponding set of one or more openings when the adjustable plate is in each of the plurality of positions, the locking pins being biased towards the adjustable plate such that the locking pins automatically insert the corresponding set of one or more openings when the adjustable plate reaches each of the plurality of positions.

2. The trailer coupler of claim 1, wherein the plurality of positions includes a closed position in which the adjustable plate covers the hitch ball opening and an open position in which the adjustable plate does not cover the hitch ball opening.

3. The trailer coupler of claim 2, wherein the plurality of positions further includes a tow mode position in which the adjustable plate extends partially over the hitch ball opening to thereby be positioned underneath a hitch ball that is positioned in the hitch ball socket.

4. The trailer coupler of claim 1, wherein the adjustable plate includes a first set of two openings corresponding to a closed position, a second set of two openings corresponding to an open position, and a third set of two openings corresponding to a tow mode position, and wherein the one or more locking pins comprise two locking pins.

5. The trailer coupler of claim 1, wherein the locking mechanism includes one or more springs that bias the locking pins towards the adjustable plate.

6. The trailer coupler of claim 5, wherein the locking mechanism includes one or more rails studs, the one or more springs being positioned around the one or more rail studs.

7. The trailer coupler of claim 1, further comprising:

a lock that interfaces with the locking mechanism to cause the one or more locking pins to be removed from each set of one or more openings.

8. The trailer coupler of claim 7, wherein the lock is coupled to the locking mechanism in a manner that translates rotation of the lock into linear movement of the locking pins.

9. The trailer coupler of claim 7, wherein the lock comprises a servo that causes the one or more locking pins to be removed from each set of one or more openings.

10. The trailer coupler of claim 9, wherein the lock includes a wireless receiver that interfaces with the servo.

11. The trailer coupler of claim 1, wherein the locking mechanism includes an upper rail to which the one or more locking pins are secured and a lock that is coupler to the upper rail via a pivoting arm such that when the lock is turned, the pivoting arm causes the upper rail and the one or more locking pins to move upwardly to retract the one or more locking pins from the corresponding set of one or more openings.

12. The trailer coupler of claim 11, wherein the locking mechanism includes a lower rail and one or more rail studs that extend upwardly from the lower rail, the upper rail moving along the one or more rail studs, wherein one or more springs are positioned around the one or more rail studs above the upper rail to thereby bias the one or more locking pins towards the adjustable plate.

13. The trailer coupler of claim 1, wherein the base plate comprises:

a lower portion; and an upper portion forming a channel, the adjustable plate being positioned within the channel.

14. The trailer coupler of claim 13, wherein a portion of the coupler body extends overtop the channel to retain the adjustable plate within the channel.

15. The trailer coupler of claim 1, wherein the adjustable plate is moved to each of the plurality of positions by one of a sliding motion or a pivoting motion.

16. The trailer coupler of claim 1, wherein the locking mechanism includes a lower rail from which one or more rail studs extend upwardly, an upper rail to which the one or more locking pins are secured, the upper rail being configured to slide along the one or more rail studs, and one or more springs that are positioned around the one or more rail studs above the upper rail, the one or more springs biasing the locking pins downwardly towards the adjustable plate.

17. A trailer coupler comprising:

a coupler body having a hitch ball socket;

a base plate secured to the coupler body, the base plate having a hitch ball opening to allow a hitch ball to be inserted into the hitch ball socket;

an adjustable plate contained within the base plate and configured to be positioned at a plurality of positions within the base plate; and a locking mechanism that secures the adjustable plate in each of the plurality of positions;

wherein the base plate forms a channel in which the adjustable plate slides; and wherein the base plate includes a sliding slot that extends around the channel, and the adjustable plate includes a retaining ledge that inserts into the sliding slot.

18. A trailer coupler comprising:

a coupler body having a hitch ball socket;

a base plate secured to the coupler body, the base plate having a hitch ball opening to allow a hitch ball to be inserted into the hitch ball socket, wherein the base plate includes a ridge that protrudes downwardly from the base plate and spans a width of the base plate adjacent to the hitch ball opening;

an adjustable plate contained within the base plate and configured to be positioned at a plurality of positions within the base plate; and a locking mechanism that secures the adjustable plate in each of the plurality of positions.

19. A trailer coupler comprising:

a coupler body having a hitch ball socket;

a base plate secured to the coupler body, the base plate having a hitch ball opening to allow a hitch ball to be inserted into the hitch ball socket;

an adjustable plate contained within the base plate and configured to be positioned at a plurality of positions within the base plate; and a locking mechanism that secures the adjustable plate in each of the plurality of positions, wherein the locking mechanism includes one or more rail studs and one or more rails that move along the rail studs when a lock coupled to the locking mechanism is turned.

20. The trailer coupler of claim 19, wherein the locking mechanism further includes one or more locking pins that move with the one or more rails, the one or more locking pins inserting into each of a plurality of sets of one or more openings in the adjustable plate to thereby secure the adjustable plate in each of the plurality of positions.

* * * * *